Figures 1, 2:
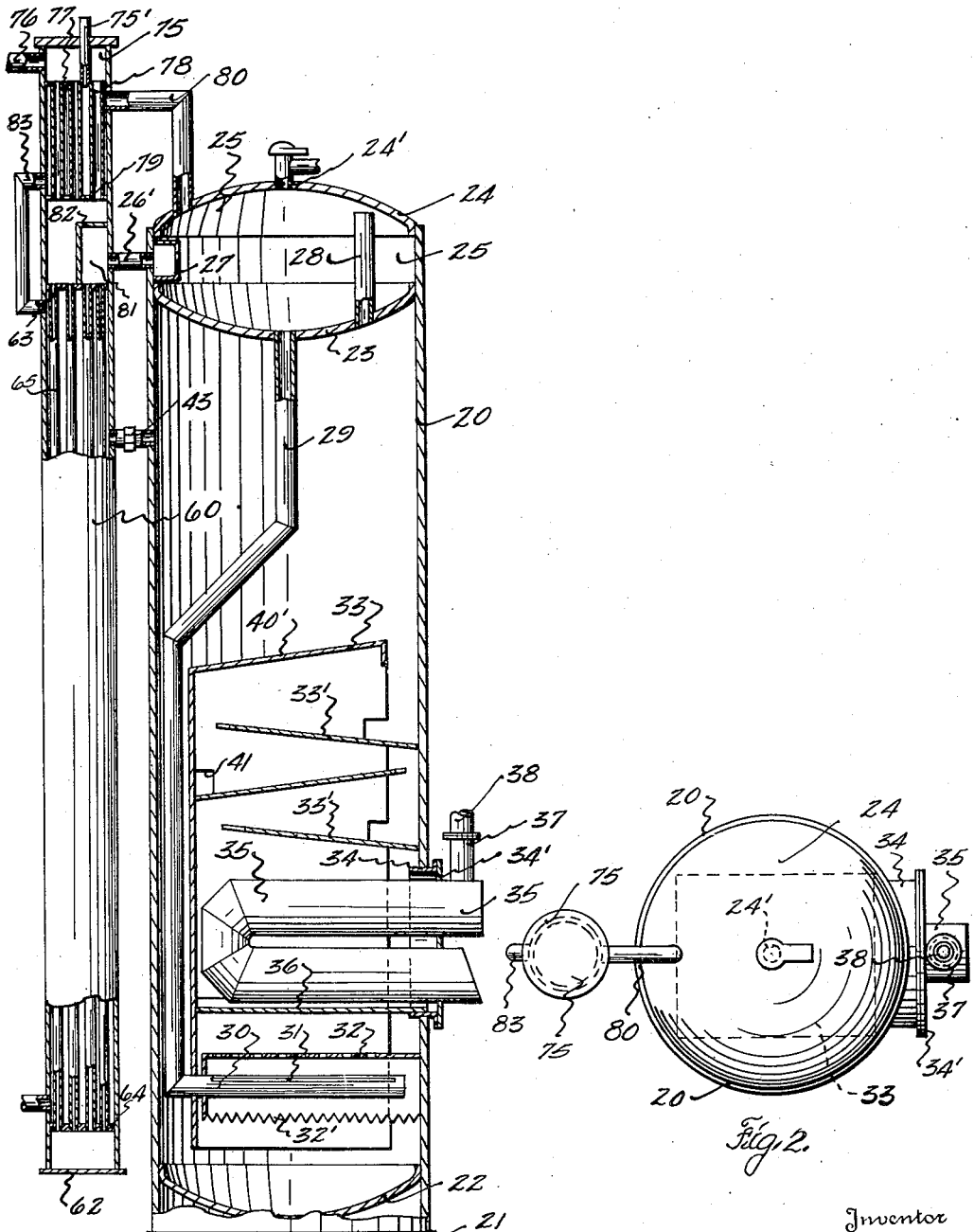

Nov. 28, 1939. J. P. WALKER 2,181,683

TREATMENT OF OIL, WATER, AND GAS EMULSIONS

Original Filed March 29, 1935

Inventor
JAY P. WALKER

By
Attorney

Patented Nov. 28, 1939

2,181,683

UNITED STATES PATENT OFFICE 2,181,683

TREATMENT OF OIL, WATER, AND GAS EMULSIONS

Jay P. Walker, Tulsa, Okla., assignor of forty per cent to Guy O. Marchant and six per cent to C. G. Wells, both of Tulsa, Okla.

Original application March 29, 1935, Serial No. 13,675. Divided and this application September 12, 1936, Serial No. 100,574

2 Claims. (Cl. 183—2.7)

This invention relates to new and useful improvements in the treatment of oil, water and gas emulsions.

This application is filed as a division of my copending application, filed March 29, 1935, Serial Number 13,675.

One object of the invention is to provide an improved apparatus for handling or treating substantially any grade of emulsion with minimum losses of the desirable gaseous fluids.

An important object of the invention is to provide an improved treating unit wherein the emulsion is treated by heat, and provided with means located exteriorly of the unit for cooling either the oil or gas, or both, whereby the oil is more readily admixed with the gases and gaseous liquids.

A further object of the invention is to initially separate a portion of the gas from the emulsion, and then precipitate the water from the oil and remaining gas, after which the oil is conducted from the tank and cooled; the gas which has been initially separated being conducted from the tank and cooled through a heat exchange, whereby the higher volatiles or liquid content is separated therefrom, and then admixed with the cool oil which raises the gravity of the oil; the cooling of both gas and oil making for more efficient mixing thereof.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in section and partly in elevation of a treating apparatus, constructed in accordance with the invention, and Figure 2 is a plan view of the same.

In the drawing, the numeral 20 designates an upright cylindrical tank of the usual construction, such as is used in the building of separators. The tank is provided with a suitable base 21 and a false bottom 22. A dished head 23 is secured within the tank near the upper end thereof, while the extreme upper end of said tank is closed by a crowned cap or top 24. The members 23 and 24 seal off the upper portion of the tank, and as is obvious by observing Figure 1, are spaced from each other so as to form a receiving or separating chamber 25 therebetween.

An inlet pipe 26' extends through the wall of the chamber 25 at the upper end thereof and discharges into a diverter box 27, whereby the influent is caused to take a circumferential course around the inner wall of said chamber. The influent is scrubbed on the wall of the chamber 25, while the gaseous fluids which are separated rise therein. A suitable outlet may be connected in an axial opening 24' provided in said top 24. A vertical pipe 28 is mounted in the head 23 and extends upwardly within the chamber 25. The pipe is located at one side of the head and has its upper end terminating just below the top 24, whereby a communication is established between the chamber 25 and the upper portion of the tank 20 below the head 23. This pipe 28 will permit gaseous fluids to flow either upwardly or downwardly therethrough, whereby pressures on both sides of the head 23 will be equalized. It will also permit gas liberated above or below the head to flow either down into the tank or up into the chamber. Counterflows may be caused either by excessive well pressures or pressure differentials.

The liquids which have been primarily separated from the gas, but which contain some gas in solution, flow from the chamber 25 down an axial discharge pipe 29. The pipe 29 extends from the bottom of the head 23 and is offset so as to extend downwardly in close proximity to the wall of said tank. At its lower end the pipe 29 is connected to one end of a horizontal pipe 30 which extends diametrically across the tank, as is best shown in Figure 1. The nozzle 30 has one or more elongated slots 31 therein and these slots may be located wherever desired. The mixture or emulsion composed of oil and water and substantially free from gas, is discharged from the nozzle into a receiving hood 32 which has a generally rectangular shape. The hood extends from the wall of the tank inwardly so as to overhang the nozzle, and the flat top of the hood is preferably provided with perforations, while the lower edges of its vertical walls are formed with saw-teeth 32'.

The emulsion which is discharged into the hood from the nozzle will have a tendency to rise but it cannot escape except through the perforations in the hood or downwardly and around the saw-teeth edges 32'. The hood 32 acts as a spreader and causes the emulsions to flow more or less horizontally or laterally from the nozzle. Because of the degasification in the chamber 25 the emulsion discharged from the nozzle will flow more or less unagitated. The saw-teeth and the perforations break up the emulsion into numerous small streams and thereby reduce the surface tension of the oil.

An upright housing 33, which is closed on three vertical sides and which has its bottom open, is disposed in the lower part of the tank. The vertical edges along the open sides of the housing are attached to the inner wall of the tank 20, as is shown in Figure 3. The hood 32 is contained within the lower portion of the housing a substantial distance above the open bottom thereof. The housing is provided with transverse inclined baffles 33' which are located in staggered relation and the arrangement or mounting of the housing 33 within the tank is the same as the thermo-syphon treating unit fully shown and described in my co-pending application filed March 29, 1935, Serial No. 13,675, and my continuing application, Serial No. 280,362, filed June 21, 1939.

The tank 20 is provided with a manhole 34 which is located just above the hood 32, and a U-shaped tubular fire box 35 is mounted in the cover 34' of the manhole. The fire box extends into and across the tank within the housing 33 and it will be seen that by removing the manhole cover 34', said fire box may be bodily removed from the tank. The lower leg of the box is supported upon an angle bar 36 extending from the manhole to the opposite wall of the housing. This lower leg of the box is open and receives a suitable burner or heater (not shown), while the upper leg of said fire box is closed and carries a nipple 37 extending upwardly from the projecting end to which a suitable stack 38 may be attached. It is to be specifically noted that the invention is not to be limited to any particular kind of heat or heating element, as any suitable means for heating may be employed.

Under operating conditions, the water level within the tank 20 will stand some distance above the top of the housing 33, while the oil level will stand some distance above the water level. It is to be understood that the water level may, if desired, be below the top of the housing and any suitable means may be employed for controlling this water level. Therefore, it will be seen that the water standing within the tank 20 will be heated by the heater 35, and the emulsion which is discharged from the nozzle 31 will comingle with the body of heated water as it flows upwardly in the housing 33.

The action or operation is exactly the same as that of the treating unit disclosed in my co-pending application hereinbefore referred to. The upwardly flowing emulsion passing through the zone of the fire box 35 in the housing 33 will be properly heated and will then encounter the transverse inclined baffles 33' and as the emulsion passes upwardly through the housing, the water will be precipitated. Apertures or openings 41 are provided in the vertical side wall of the housing just above each baffle and nearer the lower ends. These openings permit water which is separated from the emulsion to run down the upper side of the baffle and escape from the housing. By the time the emulsion reaches the upper end of the housing and escapes into the tank from beneath the inclined top 40' of said housing, substantially all of the water will be separated therefrom and the upwardly flowing stream will be practically all oil with some gas in solution.

Due to the arrangement of the housing and baffles, a thermo-syphon action will be set up whereby circulation of water will be provided down through the vertical passages on each side of the housing 33 and upwardly within said housing. This recirculating of the water aids in heating the influent discharged from the nozzle 31, thus requiring less heat to be supplied by the fire box. Further, the heated water passing downwardly around the housing and within the tank tends to insulate, by heat exchange, the fluids and liquids being heated within the housing 33, against the temperatures outside of the tank.

After the emulsion has travelled through the housing 33, it will finally escape from beneath the inclined top 40' of said housing and into the upper end of the tank 20. By the time the emulsion has reached this point, the water has been precipitated therefrom and the separated oil may then escape through an outlet pipe 43 which is provided in the wall of the tank 20 at a point below the head 23.

The pipe 43 discharges into the upper portion of the oil section of a preheating and cooling device 60 mounted vertically at the side of the tank 20. This device has upper and lower heads 63 and 64, respectively, supporting the ends of tubes 65 extending through the said oil section. The lower head 63 is located above a cap 62 closing the bottom of the device 60. A condenser 75 is mounted on the upper end of the device 60 above the head 63. The condenser has an inlet pipe 76 which receives the influent from the well and this pipe is located at the upper end thereof. A head 77 is spaced below this inlet and supports the upper ends of vertical tubes 78 which are open to receive the influent. The lower ends of these tubes are fastened in a bottom head 79. This upper end of the space between the heads is connected by a right angular pipe 80 with the top of the chamber 25, whereby gas rising from said chamber enters the condenser 75 and flows around and in contact with the vertical tubes 78. The gas being more or less warm will be cooled by the cold influent and thereby condensed, whereby the liquid gases are recovered. Below the head 79 and above the top head 63 of the device 60, a right angular passage 81 is formed by a right angular partition 82. This partition causes the influence which discharges at the lower end of the tubes 78 to flow downwardly through the outer tubes 65 which are located within the preheater and cooler 60. The influent flows down these outer tubes to the bottom of the device 60 below the lower head 64 and then upwardly through the inner tubes to the angular pipe 81 formed above the head 63. By reason of the angular partition 82 the influent is directed into the pipe 26' which discharges into the diverter 27 within the chamber 25.

The diverter causes the influent to whirl or travel circumferentially around the chamber 25 whereby the major portion of the gas is released. Since the influent has been heated it is obvious that the gas will more readily escape. The gas which is separated in the chamber 25 flows upwardly into the pipe 80, while the oil and water mixture passes downwardly through a discharge pipe 29, as in the other forms. The lower portion of the condenser 75 is connected by a pipe 83 with the upper portion of the device 60 below the upper head 63. It is obvious that the warm gases escaping from the chamber 25 pass into the condenser 75 and are cooled therein, which causes a condensation of these gases to be effected. This condensation permits the condensible vapors, such as gasoline, to be recovered. These condensates pass downwardly through the pipe 83 and are admixed with the oil flowing into the device 60 through the discharge pipes 43. The mixture is more readily effected because the gas has been cooled and also because the oil is cooled in flowing downwardly through the device 60. The non-condensible gases in the space surrounding the tubes in condenser 75 escape through an outlet pipe 75' extending upwardly therefrom.

Therefore, it will be seen that a majority of the gas is first separated from the emulsion, and the oil and water mixture passed through the treating unit. After the water and oil are separated, said oil is cooled and the gas which has been primarily separated, is also cooled. The oil and liquid content of the gas, as well as the gas, are then remixed to restore the specific gravity of said oil. The cooling of the gas and oil facilitates the mixing thereof. It is noted that in all forms the cooling of the gas and oil occurs exteriorly of the treating tank. It is pointed out that although a thermo-syphon treating unit, such as is fully described in my co-pending application, hereinbefore referred to, is employed, any suitable unit for accomplishing the separation may be employed.

What I claim and desire to secure by Letters Patent, is:

1. A separator including, the combination of an upright tank having means therein for separating gas from the influent entering said tank, a gas condenser at the upper end of the tank having an influent inlet and outlet as well as a gas outlet, means in the condenser for conducting the influent in a segregated path therethrough, means for conducting gas from the separating means of the tank to the condenser, a preheater connected with the outlet of the condenser for receiving the influent therefrom, a conductor for conveying the gas condensate from the condenser to the preheater, means for conducting hot oil from the tank into the preheater and mixing it with the condensate, means for conducting the hot oil from the preheater, means for conducting the influent through the preheater without contact with any other liquid, the influent passing relatively through the hot oil so as to be preheated thereby, a conductor for conducting the preheated influent from the preheater to the tank, means for maintaining a water level in the tank, means in the tank for washing the influent in the water thereof to separate the oil and water of the influent, means for heating the water in the tank, means for discharging water from the tank.

2. A separator including, an upright tank, a separating chamber at the upper end of the tank having a bottom exposed to hot gases accumulating at the upper end of the tank, a gas outlet extending from the top of the tank, an oil outlet in the upper end of the tank below the bottom of the chamber, a gas equalizing pipe extending from the bottom of the chamber, an emulsion influent inlet at one side of the chamber, an emulsion washing device occupying the lower portion of the tank, a restricted pipe extending from the bottom of the chamber down through the tank to the lower end thereof for steadily discharging the oil and water mixture from the separating chamber into the lower end of the washing device, a condenser mounted at the upper end of the tank, a gas pipe extending from the separating chamber to the condenser, an emulsion inlet to the condenser, means for conducting the emulsion through the condenser without admixing with gas therein, a preheater connected with the condenser for receiving the emulsion influent therefrom and connected with the separating chamber for delivering the preheated emulsion thereto, and means for conducting the condensate from the condenser to the preheater.

JAY P. WALKER.